(No Model.)
R. C. BEARDSLEY.
CONDUIT ELECTRIC RAILWAY.
No. 514,056. Patented Feb. 6, 1894.
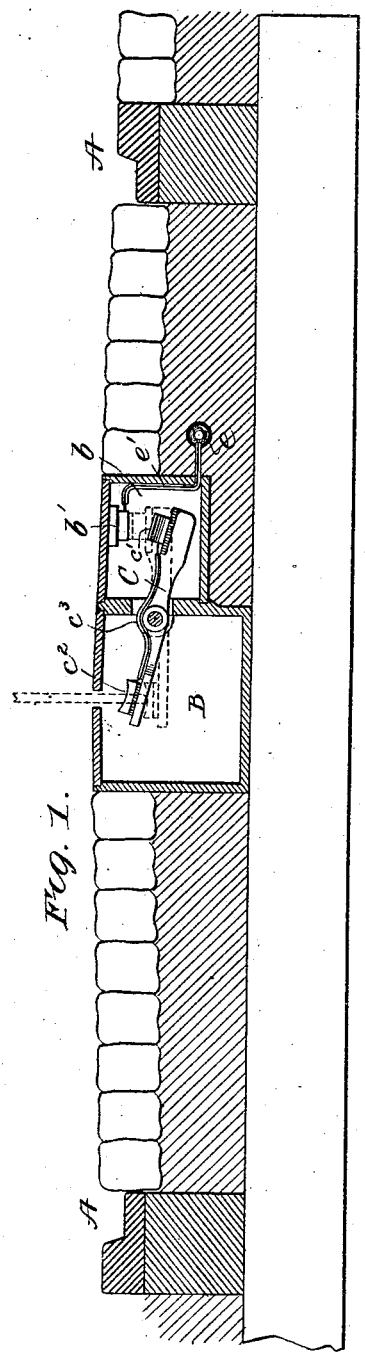
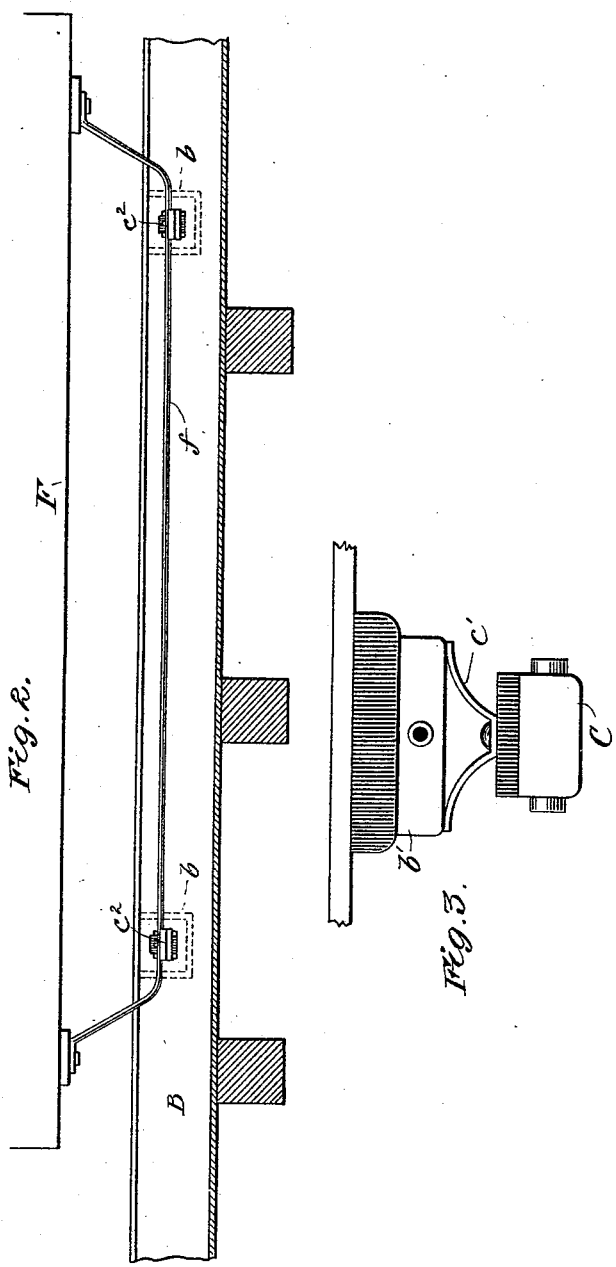
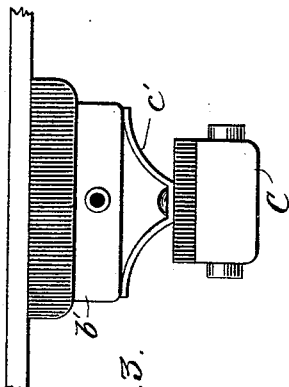
WITNESSES:
Frank S. Ober.
H. A. Opperman.
INVENTOR
Rufus C. Beardsley
BY
Wm. A. Rosenbaum
ATTORNEY
THE NATIONAL LITHOGRAPHING COMPANY,
WASHINGTON, D. C.

UNITED STATES PATENT OFFICE.

RUFUS CHARLES BEARDSLEY, OF LAFAYETTE, INDIANA.

CONDUIT ELECTRIC RAILWAY.

SPECIFICATION forming part of Letters Patent No. 514,056, dated February 6, 1894.

Application filed January 28, 1893. Serial No. 460,013. (No model.)

*To all whom it may concern:*

Be it known that I, RUFUS CHARLES BEARDSLEY, a citizen of the United States, residing at Lafayette, in the county of Tippecanoe and State of Indiana, have invented certain new and useful Improvements in Electric Railways, of which the following is a full, clear, and exact description.

My invention relates to electric railways, and has special reference to the underground conduit system.

The object of the invention is to provide a system which shall be cheap of construction, and in which the parts may be inspected and repaired with facility.

A further and important object of the invention is a system of this nature in which there can be but little loss of current due to leakage. The main conductor or feeder is effectually insulated, and the exposed portions of the conductor are only charged with current when the vehicle passes. There are a number of systems in which this idea is carried out, but my invention consists of details of construction which I believe render my system more perfect in its operation than those heretofore devised.

My invention is illustrated in the accompanying drawings, in which—

Figure 1 represents a cross-section of the road-bed and my improved conduit. Fig. 2 is a longitudinal section of the conduit, showing the device carried by the car which acts in combination with devices in the conduit, and Fig. 3 is a detail of the switch.

Referring to the drawings by letter, A, A represents two rails of a track, and midway between these I locate in the ground a conduit B, preferably, of iron, and closed at the top by a removable plate provided with the usual slot to admit a plow, or other device carried by the cars. This conduit is free and clear, so far as mechanism is concerned, and may therefore be cleared of snow or moisture with facility.

At regular intervals shorter than the length of a car, I construct boxes $b$, one wall of which is formed by one of the side walls of the conduit. Each of these boxes contains a metallic block $b'$, which is preferably secured to, and insulated from, the cover of the box. This cover is flush with the surface of the street, and is removable, so that the contents of the box may at any time be inspected and repaired.

In the walls separating the box from the conduit, a lever $c$, is pivoted, and is free to swing on its pivot a certain distance. The end projecting into the box is heavier than the other end, or it may be operated by a spring, so that it will normally be lowest. This end of the lever also carries a spring clip $c'$, which is adapted to make contact with the block $b'$, when this end of the lever is thrown to its upper position. The end of the lever projecting into the conduit stands directly beneath the slot, and carries a metallic contact-piece $c^2$, which is insulated from the lever, but electrically connected with the clip $c'$, by a conductor $c^3$, or the contact piece may be electrically connected with the lever and the lever insulated from the conduit. The main conductor or feeder for the system, which is represented by $e$, is buried in the road-bed, supported overhead or laid in a conduit, as desired, but in either case it is thoroughly insulated throughout its entire length. It is connected with the blocks $b'$, in the boxes along the conduit, by branch conductors $e'$.

The car, which is represented by F, carries a shoe, $f$, which projects from the under side thereof into the conduit. It is metallic and long enough to bridge from one box $b$, to another. It is preferably in the form of a bent rod, as shown in Fig. 2, connected with the car at its ends only so that in passing around curves it will not bind in the slot. The ends of the shoe are curved upward, so that they will easily run upon the ends of levers $c$, and force the same downward as the car proceeds.

In operation the shoe successively swings the levers $c$, on their pivots, and throws the clips $c'$, into contact with block $b'$, thereby closing the circuit from the feeder $e$, to the motor on the car. When the shoe has passed over the lever, the heavy end of the spring of the latter carries it out of contact with the block b', and thus breaking the circuit, and cutting off the current from all exposed parts of the system. As the shoe is long enough to bridge from one lever to another, the circuit to the motor is never broken.

Having thus described my invention, I claim—

1. The combination of the slotted conduit and the switch-boxes arranged along side the same, electric switches in the boxes movable parts of which project into the conduit, and removable covers for the boxes upon which a portion of the switches is mounted, substantially as described.

2. In an electric railway system, the combination of a slotted conduit, electric switches arranged alongside the same at intervals, a traveling vehicle and an operating device connected with said vehicle and consisting of a rod connected solely at its ends with the car and bent downward to extend into the slotted conduit and of sufficient length to bridge two or more of the switches.

3. In an electric railway, the combination of a slotted conduit, a series of switch boxes arranged along the same, switch levers pivoted in the wall of said conduit and having one end projecting into the conduit and the other into a switch box, an electrical contact carried by the cover of the switch box, a main conductor in electrical connection with each of said contacts, and mechanism carried by a moving vehicle for throwing said levers into contact successively with their respective contact points, for the purpose set forth.

In testimony whereof I subscribe my signature in presence of two witnesses.

RUFUS CHARLES BEARDSLEY.

Witnesses:
JOS. KETTLESTRINGS,
J. H. KLEPINGER.